(12) United States Patent
Iyer et al.

(10) Patent No.: US 8,578,148 B2
(45) Date of Patent: Nov. 5, 2013

(54) METHOD AND SYSTEM TO TRANSMIT CODE TO A SYSTEM ON A CHIP (SOC)

(75) Inventors: Mahesh Iyer, Saratoga, CA (US); Stephen George Siener, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 554 days.

(21) Appl. No.: 12/845,175

(22) Filed: Jul. 28, 2010

(65) Prior Publication Data

US 2011/0185162 A1 Jul. 28, 2011

Related U.S. Application Data

(60) Provisional application No. 61/297,683, filed on Jan. 22, 2010.

(51) Int. Cl.
- *G06F 9/24* (2006.01)
- *G06F 9/00* (2006.01)
- *G06F 15/177* (2006.01)
- *G06F 9/44* (2006.01)
- *G06F 9/445* (2006.01)

(52) U.S. Cl.
USPC .................. 713/100; 713/1; 713/2; 717/168; 717/174

(58) Field of Classification Search
None
See application file for complete search history.

(56) References Cited

U.S. PATENT DOCUMENTS

| | | | |
|---|---|---|---|
| 7,130,980 B2 * | 10/2006 | Pina et al. | 711/170 |
| 7,376,870 B2 * | 5/2008 | Kataria et al. | 714/47.1 |
| 7,454,605 B2 * | 11/2008 | Bayus et al. | 713/1 |
| 2002/0065950 A1 * | 5/2002 | Katz et al. | 709/318 |
| 2004/0107328 A1 * | 6/2004 | Schultz et al. | 711/170 |
| 2008/0098212 A1 * | 4/2008 | Helms et al. | 713/155 |

* cited by examiner

*Primary Examiner* — Ji H Bae

(74) *Attorney, Agent, or Firm* — Sterne, Kessler, Goldstein & Fox P.L.L.C.

(57) ABSTRACT

A method and system to transmit code to a System on Chip (SOC) from a host processor using a host-side driver is provided herein. The SOC and host processor are coupled by a bus. The host driver receives an overlay from an application layer and stores the overlay. The host driver receives an IOCTL to be transmitted to the SOC. The host driver determines whether an input/output control (IOCTL) value of the IOCTL to be transmitted to the SOC corresponds to an IOCTL value in one of the stored overlays. The host driver transmits an overlay to the SOC if the IOCTL value of the IOCTL to be transmitted is equal to at least one IOCTL value in the overlay. The host driver then transmits the IOCTL to the SOC.

23 Claims, 8 Drawing Sheets

METHOD AND SYSTEM TO TRANSMIT CODE TO A SYSTEM ON A CHIP (SOC)

CROSS-REFERENCE TO RELATED APPLICATIONS

This application claims the benefit of U.S. Provisional Application No. 61/297,683 filed on Jan. 22, 2010, which is incorporated herein by reference in its entirety.

BACKGROUND OF THE INVENTION

1. Field of the Invention

This invention generally relates to transmitting code to a System On a Chip (SOC).

2. Background Art

System On a Chip (SOC) designs typically have limited memory to store code or data. Methods and systems are needed to overcome the above limitation.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

Figure 1:
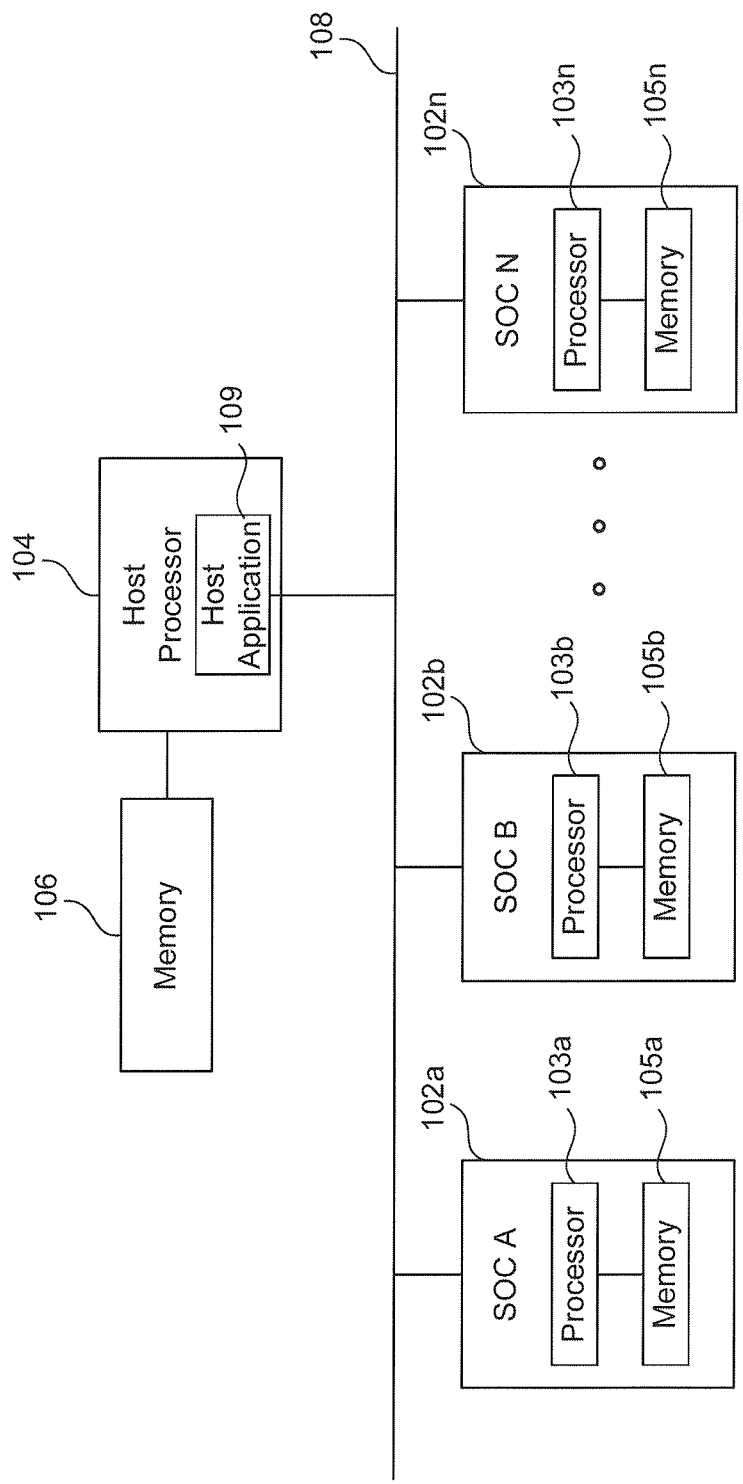
FIG. 1 illustrates an example system according to an embodiment of the invention.

FIG. 1 illustrates an example system 100 according to an embodiment of the invention. System 100 includes SOCs 102a-n, host processor 104 and memory 106. Each SOC 102 includes a processor 103 coupled to a memory 105. Each SOC 102 interfaces to the host processor 104 across a bus 108 that typically has a higher latency relative to a processing speed of a processor 103.

A SOC 102 typically requires memory space to store code and/or data. However, the amount of available memory 105 is usually limited. In typical systems, all code required by a SOC 102 is stored in memory 105 after initialization. The amount of memory 105 required to store all required code for SOC 102 significantly increases the amount of silicon required, as well as the amount of power required for the additional memory. The increased silicon real estate also increases the manufacturing cost. The increased power requirement may be detrimental for power critical applications in low-power devices such as hand held mobile devices.

Embodiments presented herein provide a method of storing code, for example in memory 106 that is coupled to host processor 104, and transmitting the code from the host processor 104 to the SOC 102 as needed in an efficient manner across bus 108.

In an embodiment, code that is not required to be locally stored in memory 105 of SOC 102 till a change of state in SOC 102 occurs can be stored in, for example, memory 106 of host processor 104. In an example, the change in state of SOC 102 is triggered by a request from the host processor 104. In this example, the request from the host processor 104 to change the state of a SOC 102 is also used to transmit code/data across the bus 108 to the SOC 102. The SOC 102 may store the code in memory 105.

In another example, a trigger within a SOC 102 itself changes the state of SOC 102. In response to the state change, the SOC 102 signals an event back to the host processor 104 to request the host processor 104 to transmit code/data to SOC 102. In this example, SOC 102 may send the signal to host processor 104 earlier than the actual time of the state change in the SOC 102 to account for the latency of bus 108 and a turn around time of host processor 104.

Figure 4A:
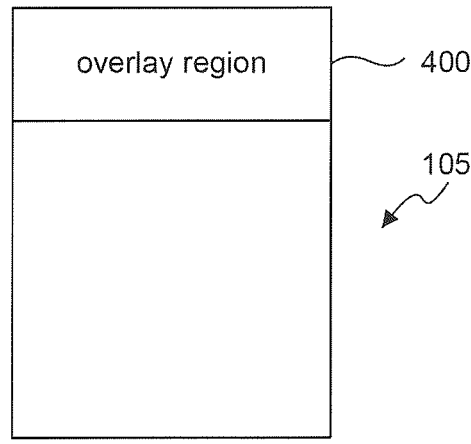
FIG. 4A illustrates an example overlay region in memory, according to an embodiment of the invention.

Embodiments presented herein may utilize overlay regions in a memory 105 of a SOC 102 to store code and/or data. An overlay is a program segment that is transmitted into memory, e.g. memory 105, when required. An overlay region is a region in memory 105 where a downloadable state (i.e. code or data) may reside. When a program is larger than the memory capacity of the machine, parts of the program not in constant use can be set up as overlays. In an example, only one downloadable state or code section may reside in an overlay region. As the program progresses, each overlay called in overwrites the existing overlay in memory. For example, FIG. 4A illustrates an example overlay region 400 in memory 105, according to an embodiment of the invention. Overlay region 400 can only store one overlay at a time. Therefore if a SOC 102 is storing a current overlay in overlay region 400 and receives a next overlay from host processor 104, SOC 102 must swap out the current overlay stored in overlay region 400 to create space to store the next overlay. Thus when using overlay regions, only one overlay can exist in overlay region 400 at a time.

Figure 4B:
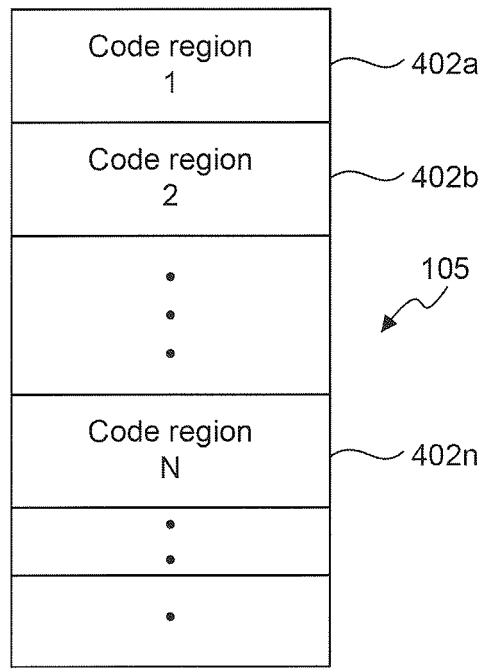
FIG. 4B illustrates example code regions in memory for hardware address translation according to an embodiment of the invention.

In alternate embodiments, instead of an overlay region, hardware address translation may be used. In this example, SOC 102 partitions memory 105 into multiple code regions and determines which region in memory can be used to store the code received from host processor 104. This allows for more than one section of code to be co-resident in memory 105 as opposed to using an overlay region 400 where only one overlay can be stored at a time. For example, FIG. 4B illustrates example code regions 402a-n for hardware address translation according to an embodiment of the invention. Using hardware address translation, multiple overlays or sections of code can co-exist in code regions 402a-n. If a SOC 102 is storing a current overlay in code region 402a and receives a next overlay from host processor 104, SOC 102 performs hardware address translation to determine a next code region, for example code region 402c, that may be available to store the next overlay. SOC 102 can then store the next overlay in code region 402b. This allows multiple overlays to be stored simultaneously in memory 105.

Embodiments presented herein may use input/output control (IOCTL) messages as state triggering events. An IOCTL is part of a user-to-kernel interface of an operating system. IOCTLs are typically used to allow user-space code to communicate with hardware devices or kernel components. In an embodiment, the command to transmit the required code/data may be implemented as an IOCTL. In an example, each overlay is transmitted to the SOC 102 as an IOCTL or followed by an IOCTL, from host processor 104. In examples presented herein, code may be transmitted in a binary format. This binary format is referred to as an "image" file.

In an embodiment, IOCTLS and overlays may be sent as part of a Remote Procedure Call (RPC). RPC is an interprocess communication that allows a program on, for example, host processor 104 to cause a subroutine or procedure to execute in another address space, for example an address space of SOC 102, without the programmer explicitly coding the details for this remote interaction. This allows a programmer to write the same code for a subroutine, whether the subroutine is local to the executing program on host processor 104 or is remotely executed in, for example, SOC 102.

Embodiments presented herein significantly reduce the amount of memory 105 required in the SOC 102, thereby reducing the cost to manufacture SOC 102. Reducing the size of memory 105 also reduces the amount of power required to run SOC 102. Embodiments presented herein may also be used to provide firmware updates to components of SOC 102 over time without fully qualifying a new SOC image. For example, if a local regulatory setting for a wireless handheld device that uses system 100 changes, then the embodiments herein may be used to replace an existing overlay in memory 105 with a modified overlay that complies with the revised regulatory standard.

Figure 2:
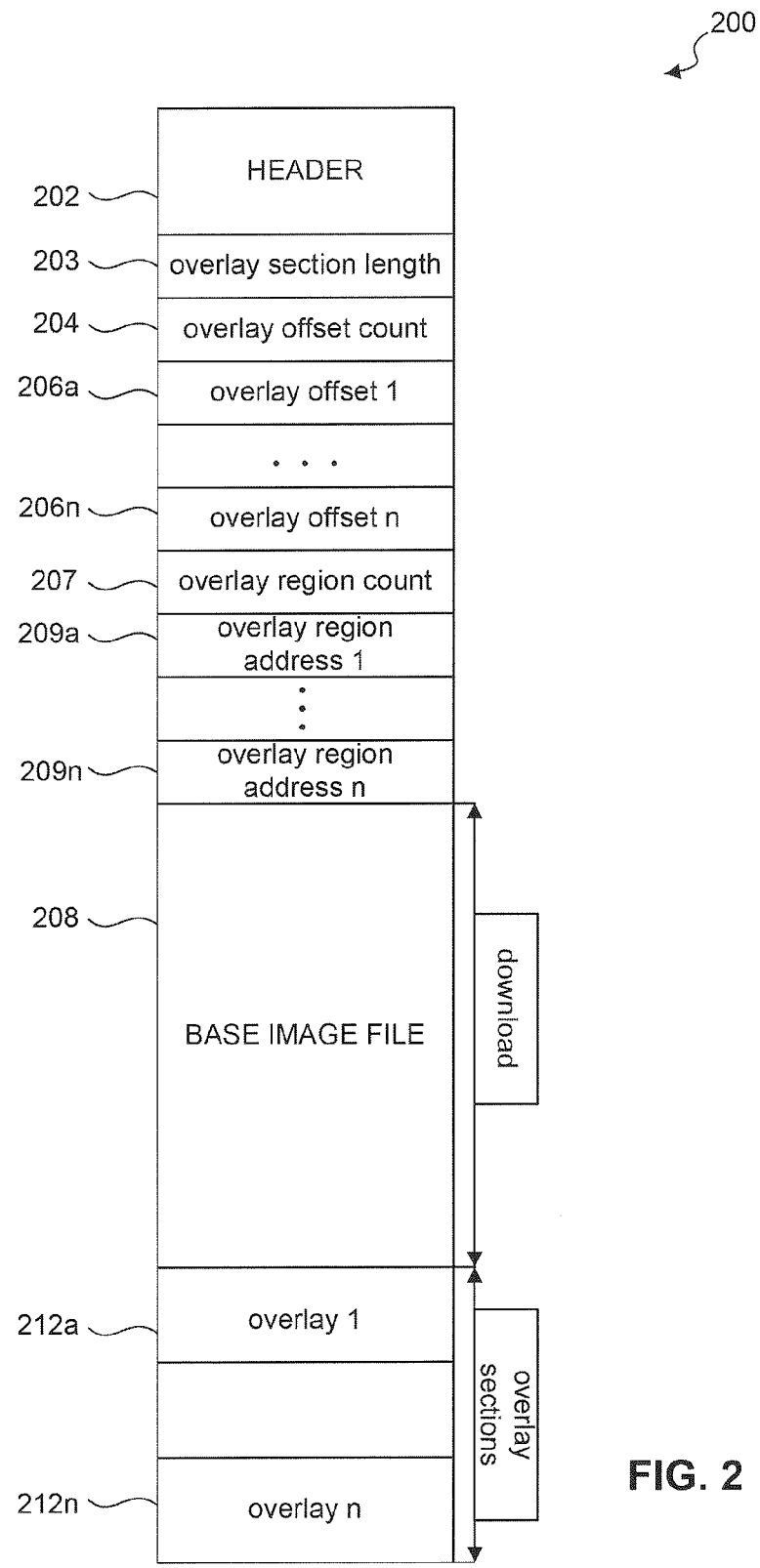
FIG. 2 illustrates an example image file according to an embodiment of the invention.

FIG. 2 illustrates and example image file 200 including one or more overlays 212a-n according to an embodiment of the invention.

Image file 200 may be stored in memory 106 of host processor 104. In an example, image file 200 may be transmitted to host processor 104 by an application layer such as host application 109 running on host processor 104. In another example, host application 109 runs remotely on host processor 104. Image file 200 may include a header 202, an overlay section length 203, an overlay offset count 204, overlay offsets 206a-n, overlay offset count 207, overlay region addresses 209a-n, a base image file 208, and overlays 212a-n corresponding to overlay offsets 206a-n.

The overlay offset count 204 indicates the number of overlay offsets 206a-n. The overlay region count 207 indicates the number of overlay region addresses 209a-n. Each of the overlay region addresses 209a-n indicate, for example, a starting addresses of corresponding code regions 402a-n in a memory 105 of a SOC 102.

In an example, base image file 208 is transmitted by host processor 104 to each of SOCs 102a-n upon startup. Overlay offsets 206a-n are relative to the beginning of base image file 208. Within image file 200, an overlay "i" (in a 0-based counting system) may start at offset[i] and end at offset [i+1]. For n overlays 202a-n, there are n+1 offset values. These offset values may alternatively be stored in a table in memory 106.

In an embodiment, if there is an IOCTL that is to be transmitted to a SOC 102 by host processor 104, then host processor 104 determines whether the IOCTL is associated with a corresponding overlay 212. If there is a corresponding overlay, host processor 104 transmits the overlay to the SOC 102 followed by the IOCTL. The IOCTL commands the SOC 102 to execute code in the overlay received by the SOC 102. The selection of an overlay 212 is described further below.

Figure 3:
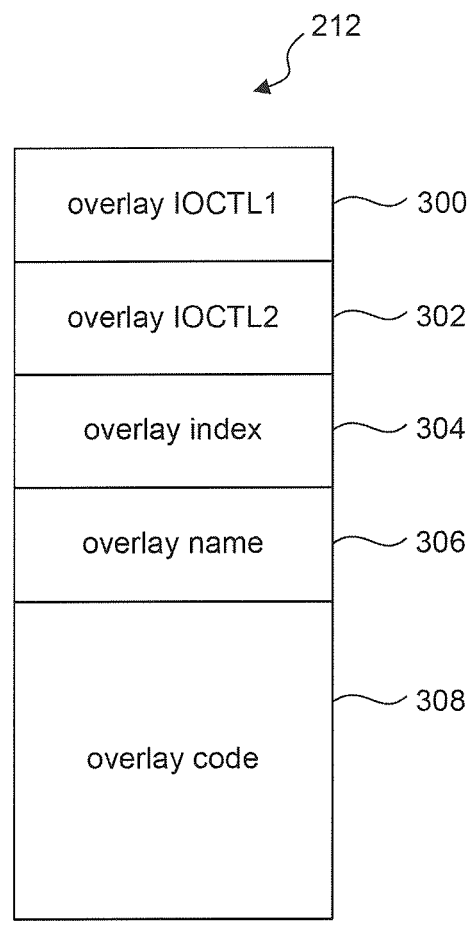
FIG. 3 illustrates and example overlay section according to an embodiment of the invention.

FIG. 3 illustrates an overlay 212 in further detail according to an embodiment of the invention.

Each overlay 212 includes a first IOCTL value 300, a second IOCTL value 302, an overlay index 304, an overlay name 306 and overlay code 308 (which may also be referred to as an "overlay image file").

Host Processor Initiated Code Transmission

In a host processor 102 initiated overlay transmission, the host processor 102 determines whether an "IOCTL value" associated with an IOCTL to be transmitted to the SOC 102 matches either first IOCTL value 300 or second IOCTL value 302. The IOCTL values may be, for example, 32 bit unsigned integers. The IOCTL values are compared for each overlay 212a-n. If the first IOCTL value 300 or second IOCTL value 302 for an overlay 212 matches the IOCTL value of the IOCTL to be transmitted, then that overlay is transmitted to the SOC followed by the IOCTL. In this example, there are two IOCTL values 300 and 302 per overlay. However, it is to be appreciated that the number of IOCTL values is a design choice and may be arbitrary.

In an example, certain IOCTLs may be associated with a string name which is compared to the overlay name 306 of an overlay 212 if there is a match for the first IOCTL value 300 or the second IOCTL value 302 of that overlay 212. The overlay is transmitted if the IOCTL string name matches the overlay name 306 and the IOCTL value matches either first IOCTL value 300 or second IOCTL value 302. It is to be appreciated that the number of IOCTL values and/or IOCTL string names compared is a design choice and may be arbitrary.

In an example, the overlay 212 is transmitted by host processor 104 in 1024-byte portions. The overlay 212 may be transmitted using an "overlay transmittal IOCTL" that is an IOCTL dedicated for transmission of an overlay 212 from the host processor 104 to a SOC 102. Following the transmission of the overlay 212, the IOCTL received from host application 109 is transmitted by host processor 104 to SOC 102. The IOCTL received from the host application 109 commands the SOC 102 to execute overlay code 308 in the transmitted overlay 212. Each overlay portion may be preceded by an overlay header. Host processor 104 copies the overlay index 304 into a "flag index" field of the overlay header. The overlay header's offset field starts at 0 and increases by 1024 bytes for each subsequent portion of overlay code 308 that is transmitted to SOC 104. The overlay header includes a length field that includes a size of a portion of overlay code 308 that is to be transmitted to the SOC 102.

In an alternate embodiment, overlay 212 is directly written by host processor 104 into a memory 105 of a target SOC 102 as opposed to using an "overlay transmittal IOCTL" as described above. In this example, the host processor 104 directly writes the overlay 212 into memory 105 of a target SOC 102. The overlay 212 is written into a memory region 402 of memory 105 at a starting address indicated by an overlay region address 209. In an embodiment, overlay region address 209 also includes an identifier that identifies the SOC 102 in addition to which code region 402 the overlay 212 is to be written to. After writing the overlay 212 into memory 105, host processor 104 sends an IOCTL received from host application 109 to the target SOC 102 that commands the SOC 102 to execute the overlay code 308 in the transmitted overlay 212.

In an embodiment, code or data transmitted to a SOC 102 can be additionally encrypted by host processor 104 and decrypted by a SOC 102 using public and/or private keys. Encryption allows data on the host processor 104 to be secure even if an open host system is in use. Encryption also secures the contents of the transmitted data against snooping of bus 108 by hackers. As an example, encryption could be used to prevent access to binary machine code and to prevent disassembly of intellectual property software running on a processor 103 of a SOC 102.

SOC Initiated Code Transmission

In a SOC initiated request for transmission of overlay code, SOC 104 transmits an event to host 104 requesting an overlay. The event includes an IOCTL value and a string name. Host processor 104 compares the IOCTL value in the message to the first IOCTL value 300 and the second IOCTL value 302 for a match to either values for each overlay 212*a-n*. In an example, host processor 104 may also compare the string name in the event to the overlay name 306 if there is a match for the IOCTL value of that overlay 212. If the IOCTL value and the string name match for a particular overlay, then the host processor transmits that overlay to the SOC 102. In alternate embodiments, only an IOCTL value or only the string name may be compared. It is to be appreciated that the number and type of values and strings compared is a design choice and may be arbitrary.

Example Methods

Figure 5:
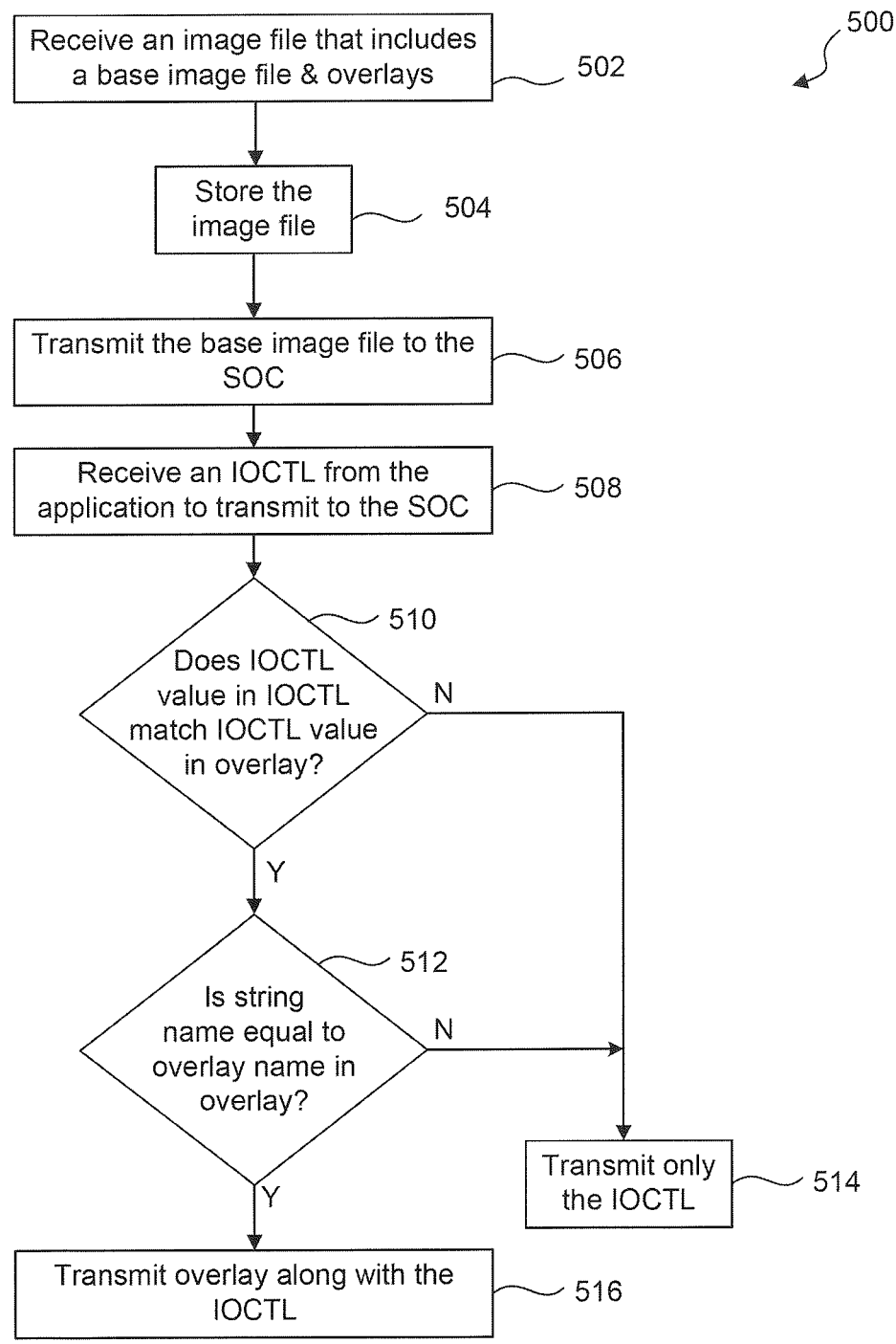
FIG. 5 illustrates an example flow chart to transmit an overlay to a SOC according to an embodiment of the invention.

FIG. 5 illustrates an example flow chart 500 to transmit an overlay to a SOC 102 according to an embodiment of the invention. Flowchart 500 will be described with continued reference to the example operating environment depicted in FIGS. 1-4. However, the flowchart is not limited to these embodiments. Note that some steps shown in flowchart 500 do not necessarily have to occur in the order shown. The steps in flow chart 500 may be performed by, for example, host processor 104 or a host driver running on host processor 104.

In step 502, an image file including a base image and multiple overlays is received. For example, host processor 104 receives, from a host application 109, an image file 200 that includes a base image file 208 and multiple overlays 212*a-n*.

In step 504, the received image file is stored. For example, host processor 104 may store the image file 200 in memory 106.

In step 506, the base image file is transmitted to a SOC. For example, host processor 104 transmits base image file 208 to a SOC 102*a* during startup.

In step 508, an IOCTL is received from the host application for transmittal to a destination SOC. For example, a host application 109 running on host processor 104 may provide an IOCTL to be transmitted to a SOC, for example SOC 102*a*.

In step 510, it is determined whether an IOCTL value in the received IOCTL matches an IOCTL value stored in one of the overlays. For example, it is determined whether an IOCTL value in the received IOCTL matches a first IOCTL value 300 or a second IOCTL value 302 in each of overlays 212.

If it is determined that there is no matching IOCTL value then the process proceeds to step 514. If it is determined, that there is a match for the IOCTL value in one of the overlays 212 in image file 200, then the process proceeds to step 512.

In step 512, it is determined whether a string name in the IOCTL received from the application in step 508 matches an overlay name 306 in the overlay 212 determined from step 510. For example, it is determined by host processor 104 whether a string name in the IOCTL received from the host application 109 matches a string name 306 stored in overlay 212 in image file 200.

If it is determined, that there is a match for the string name then the process proceeds to step 516. If it is determined, that there is no matching string name, then the process proceeds to the step 514. In an embodiment, step 512 may be optional. For example, if it is determined in step 510 that IOCTL value in the IOCTL received from the host application matches an IOCTL value in an overlay 212 then control may proceed directly to step 516 and skip step 512.

In step 514, only the IOCTL received from the host application is transmitted to the SOC. For example, host processor 104 may transmit only the IOCTL received from the host application 109 to SOC 102*a*.

In step 516, the overlay followed by the IOCTL is transmitted to the SOC. For example, host processor 104 transmits the overlay followed by the received IOCTL to SOC 102*a*. The IOCTL commands the SOC 102 to execute the overlay code 308 in the transmitted overlay 212.

Figure 6:
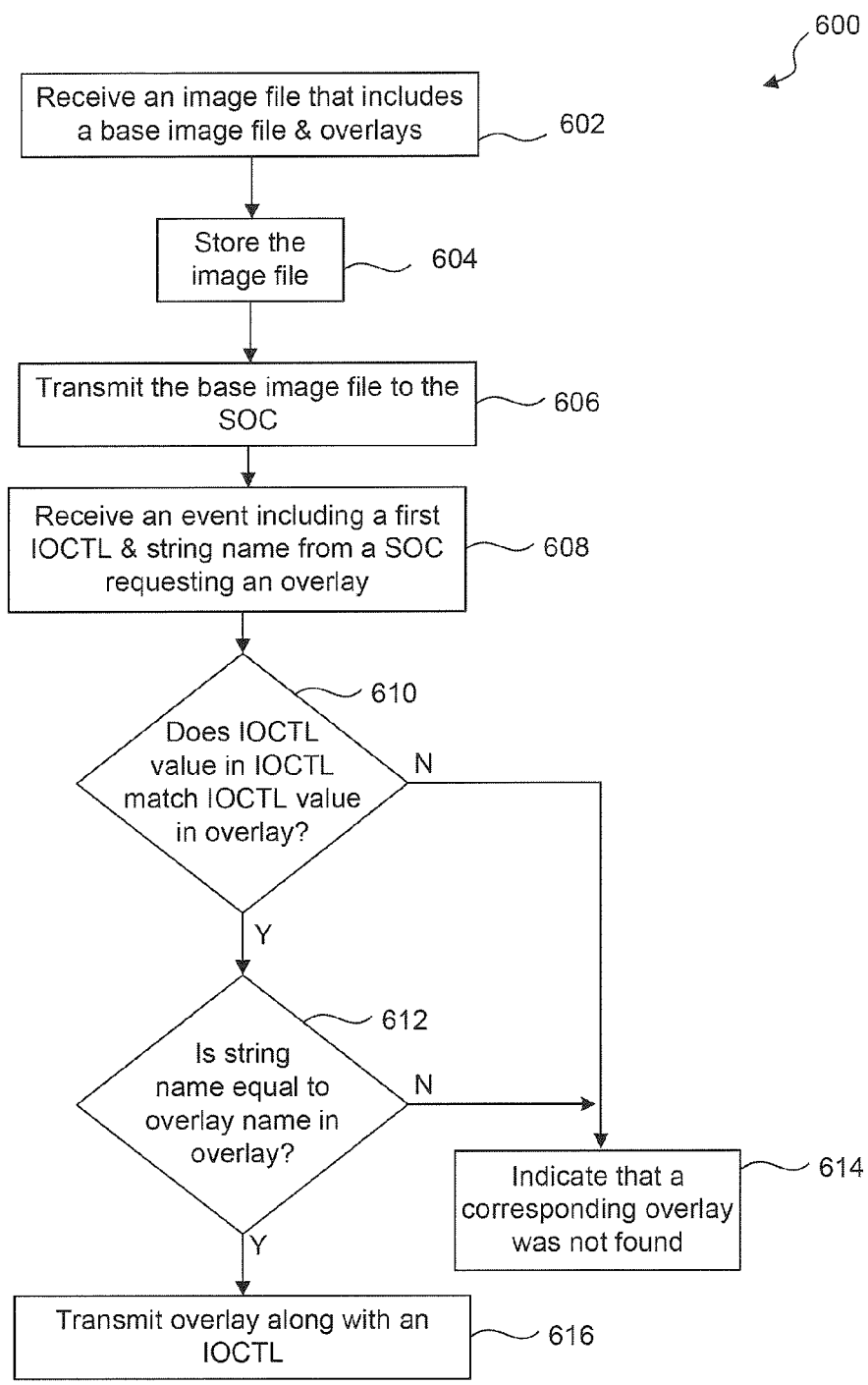
FIG. 6 illustrates an example flow chart to transmit an overlay to a SOC based on an event received from the SOC, according to an embodiment of the invention.

FIG. 6 illustrates an example flow chart 600 to transmit an overlay to a SOC based on an event received from the SOC, according to an embodiment of the invention. Flowchart 600 will be described with continued reference to the example operating environment depicted in FIGS. 1-4. However, the flowchart is not limited to these embodiments. Note that some steps shown in flowchart 600 do not necessarily have to occur in the order shown. The steps in flow chart 600 may be performed by, for example, host processor 104 or a host driver running on host processor 104.

In step 602, an image file including a base image and overlays is received. For example, host processor 104 receives, from a host application 109, an image file 200 that includes a base image file 208 and multiple overlays 212*a-n*.

In step 604, the received image file is stored. For example, host processor 104 may store the image file 200 in memory 106.

In step 606, the base image file is transmitted to a SOC. For example, host processor 104 transmits base image file 208 to a SOC 102*a* during startup.

In step 608, an event is received from a SOC requesting an overlay. The event includes an IOCTL value and a string name. For example, host processor 104 may receive an event from SOC 102*a* requesting an overlay.

In step 610, it is determined whether an IOCTL value in the received event matches an IOCTL value stored in one of the overlays. For example, it is determined whether an IOCTL value in the received event matches a first IOCTL value 300 or a second IOCTL value 302 in each of overlays 212.

If it is determined that there is no matching IOCTL value then the process proceeds to step 614. If it is determined, that there is a match for the IOCTL value in one of the overlays 212 in image file 200, then the process proceeds to step 612.

In step 612, it is determined whether a string name in the IOCTL received from the application in step 608 matches an overlay name 306 in the overlay 212 determined from step 610. For example, it is determined by host processor 104 whether a string name in the received event matches a string name 306 stored in overlay 212 in image file 200.

If it is determined, that there is a match for the string name then the process proceeds to step 616. If it is determined, that there is no matching string name, then the process proceeds to the step 614. In an embodiment, step 612 may be optional. For example, if it is determined in step 610 that IOCTL value in the event matches an IOCTL value in an overlay 212 then control may proceed directly to step 616 and skip step 612.

In step 614, a message is sent to the SOC, that originated the event in step 608, to indicate that an overlay with a matching IOCTL value and a matching string name was not found.

In step 616, the overlay is transmitted to the SOC followed by an IOCTL. For example, host processor 104 transmits an overlay 212 followed by an IOCTL to SOC 102a. The IOCTL commands the SOC 102 to execute the overlay code 308 in the transmitted overlay 212.

Figure 7:
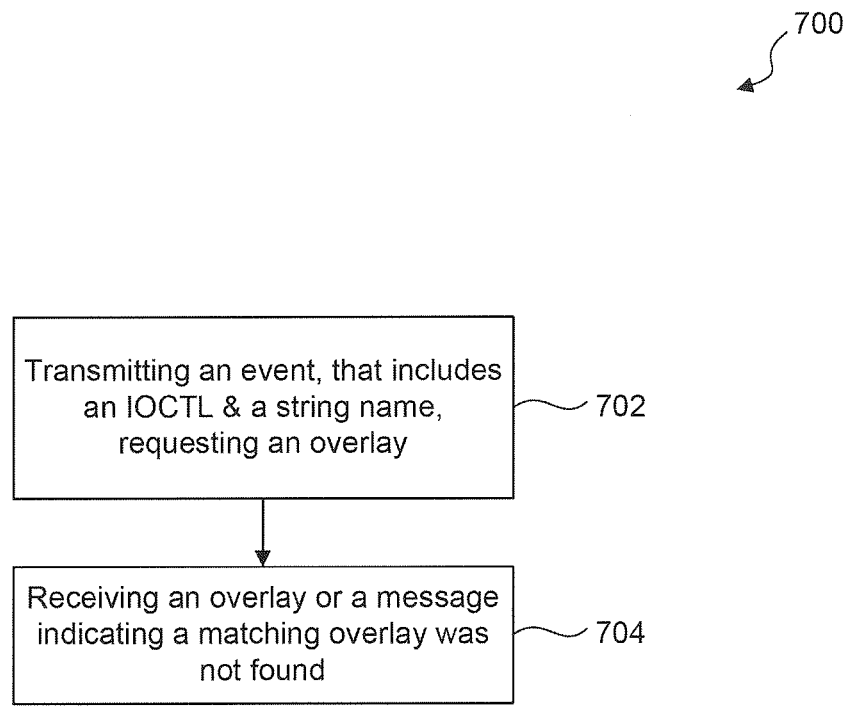
FIG. 7 illustrates an example flow chart illustrating steps performed by a SOC to request an overlay according to an embodiment of the invention.

FIG. 7 illustrates an example flow chart 700 illustrating steps performed by a SOC to request an overlay according to an embodiment of the invention. Flowchart 700 will be described with continued reference to the example operating environment depicted in FIGS. 1-4. However, the flowchart is not limited to these embodiments. Note that some steps shown in flowchart 700 do not necessarily have to occur in the order shown. The steps in flow chart 700 may be performed by, for example, SOC 102, processor 103 or a driver running on processor 103.

In step 702, an event requesting an overlay, including a first IOCTL value and a string value, are transmitted to a host processor. For example, a SOC 102a may transmit an event to request an overlay from a host processor 104.

In step 704, the SOC either receives an overlay from the host processor or a message indicating that an overlay with a matching IOCTL value and a matching string name were not found. For example, SOC 102 may receive an overlay 212 from host processor 104 if the overlay 212 includes a matching string name and IOCTL value as were present in the event from step 702. Alternatively, SOC 102 may receive a message indicating that an overlay that has a matching string name and IOCTL value as were present in the event from step 702 was not found.

Embodiments presented herein, or portions thereof, can be implemented in hardware, firmware, software, and/or combinations thereof. The embodiments presented herein apply to any communication system that utilizes packets for data transmission.

The representative functions described herein (e.g. functions performed by processor 104 or processor 103) can be implemented in hardware, software, firmware or some combination thereof. For instance, the method of flowcharts 500, 600 and 700 can be implemented using computer processors, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the functions described herein could be embodied by computer program instructions that are executed by a computer processor, for example processors 103 and 104, or any one of the hardware devices listed above. The computer program instructions cause the processor to perform the functions described herein. The computer program instructions (e.g. software) can be stored in a computer usable medium, computer program medium, or any storage medium that can be accessed by a computer or processor. Such media include a memory device, such as memory 105 or memory 106, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

Figure 8:
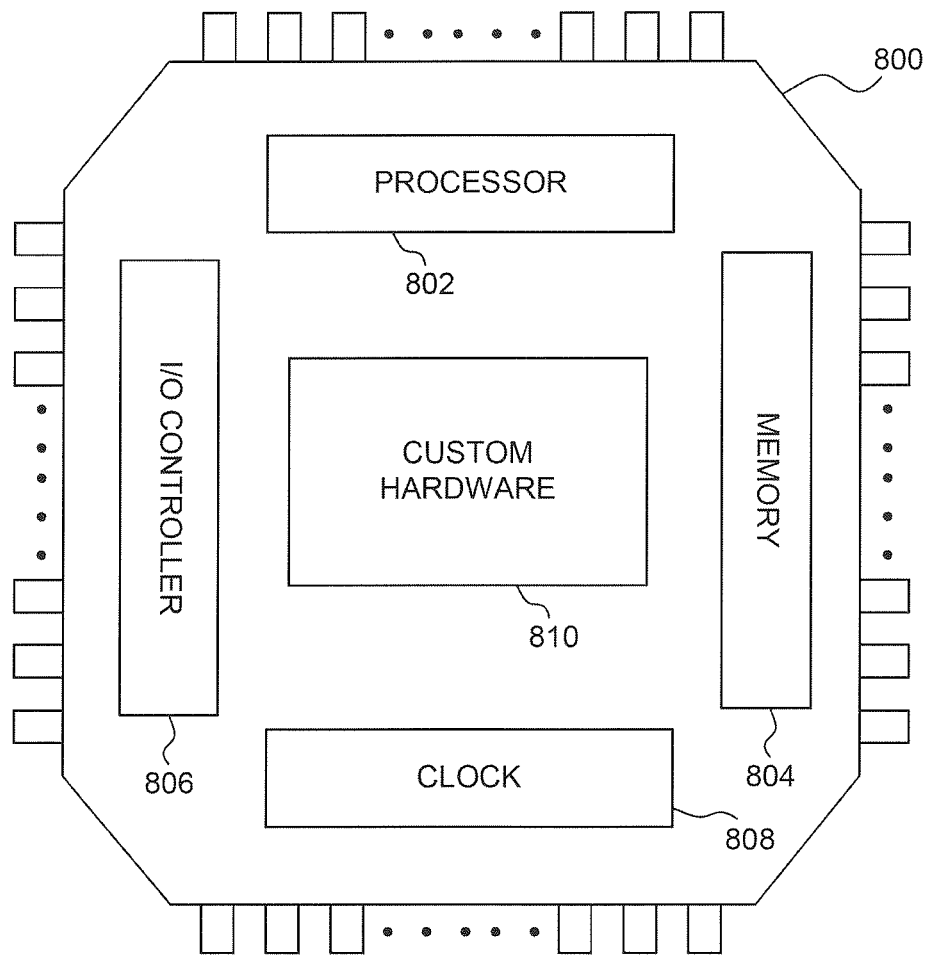
FIG. 8 is a diagram of an example System On a Chip (SOC) according to an embodiment of the invention.

FIG. 8 is a diagram of an example System on Chip (SOC) 800 according to an embodiment of the present invention.

System 800 includes a processor 802, a memory 804, an input/output (I/O) controller 806, a clock 808, and custom hardware 810. In an embodiment, SOC 800 is in an application specific integrated circuit (ASIC). System 800 may include hardwired circuitry or a Digital Signal Processing core in the form of custom hardware 810 to implement functions described herein.

Processor 802 is any processor, for example processor 103 described above, that includes features of the present invention described herein and/or implements a method embodiment of the present invention.

Memory 804 can be any memory capable of storing instructions and/or data. Memory 804 can include, for example, random access memory and/or read-only memory. Memory 804 may be memory 105.

Input/output (I/O) controller 806 is used to enable components of system 800 to receive and/or send information to peripheral devices. I/O controller 806 can include, for example, an analog-to-digital converter and/or a digital-to-analog converter. For example, I/O controller 806 may be used to communicate with host processor 104.

Clock 808 is used to determine when sequential subsystems of system 800 change state. For example, each time a clock signal of clock 808 ticks, state registers of SOC 800 capture signals generated by combinatorial logic. In an embodiment, the clock signal of clock 808 can be varied. The clock signal can also be divided, for example, before it is provided to selected components of system 800.

Custom hardware 810 is any hardware added to SOC 800 to tailor SOC 800 to a specific application. Custom hardware 810 can include, for example, hardware needed to decode audio and/or video signals, accelerate graphics operations, and/or implement a smart sensor. According to an embodiment of the invention, custom hardware 810 includes circuitry perform functions described above in flowchart 700. Persons skilled in the relevant arts will understand how to implement custom hardware 810 to tailor SOC 800 to a specific application.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A method in a host processor to transmit code to a System On a Chip (SOC), comprising:
   receiving an event from the SOC requesting an overlay, wherein the event includes a first input/output control (IOCTL) value and a string name;
   determining whether the first IOCTL value is equal to at least one IOCTL value in a first overlay of a plurality of overlays stored in a memory coupled to the host processor;
   determining whether the string name is equal to an overlay name in the first overlay if the first IOCTL value is equal to at least one IOCTL value in the first overlay; and
   transmitting the first overlay to the SOC if the string name is equal to the overlay name in the first overlay and if the first IOCTL value is equal to at least one IOCTL value in the first overlay.

2. The method of claim 1, further comprising, prior to the receiving:
   receiving an image file from a host application, wherein the image file includes at least one of a header, overlay offsets, a base image file, overlay region count, a plurality of overlay region addresses and a plurality of overlays corresponding to the overlay offsets; and
   storing the image file in a host memory;
   wherein each overlay includes a first IOCTL value, a second IOCTL value, an overlay index value, an overlay name and overlay code.

3. The method of claim 1, further comprising, prior to the receiving:
   transmitting a base image file to the SOC during startup.

4. The method of claim 1, further comprising:
   transmitting the first overlay 1024 bytes at a time.

5. The method of claim 1, the transmitting further comprising:
   encrypting the first overlay prior to transmission.

6. A method in a System on a Chip (SOC) to receive an overlay from a host processor, the SOC and the host processor coupled by a bus, comprising:
   transmitting an event to the host processor requesting the overlay, wherein the event includes a first input/output control (IOCTL) value and a string name; and
   receiving the overlay from the host processor, wherein an IOCTL value and an overlay name in the received overlay are equal to the corresponding first IOCTL value and the string name in the event.

7. The method of claim 6, further comprising, prior to the transmitting:
   receiving a base image file from the host processor during startup.

8. The method of claim 6, further comprising:
   receiving the overlay 1024 bytes at a time.

9. The method of claim 6, wherein the received overlay is encrypted.

10. The method of claim 9, further comprising decrypting the received overlay.

11. A System On a Chip (SOC), comprising:
    a memory; and
    a processor coupled to the memory and configured to execute instructions stored in the memory that cause the processor to transmit an event to a host processor to request an overlay, wherein the event includes a first input/output control (IOCTL) value and a string name, and to receive the overlay from the host processor, wherein an IOCTL value and an overlay name in the received overlay are equal to the corresponding first IOCTL value and the string name in the event.

12. The SOC of claim 11, wherein the memory includes an overlay region configured to store one overlay at a time.

13. The SOC of claim 11, wherein the memory includes multiple regions configured to allow for multiple overlays to be stored simultaneously.

14. A non-transitory computer readable medium having stored thereon computer executable instructions that, if executed by a host processor, cause the host processor to perform a method to transmit code to a System On a Chip (SOC), the method comprising:
    receiving an event from the SOC requesting an overlay, wherein the event includes a first input/output control (IOCTL) value and a string name;
    determining whether the first IOCTL value is equal to at least one IOCTL value in a first overlay of a plurality of overlays stored in a memory coupled to the host processor;
    determining whether the string name is equal to an overlay name in the first overlay if the first IOCTL value is equal to at least one IOCTL value in the first overlay; and
    transmitting the first overlay to the SOC if the string name is equal to the overlay name in the first overlay and if the first IOCTL value is equal to at least one IOCTL value in the first overlay.

15. The non-transitory computer readable medium of claim 14, further comprising executable instructions for, prior to the receiving:
    receiving an image file from a host application, wherein the image file includes at least one of a header, overlay offsets, a base image file, overlay region count, a plurality of overlay region addresses and a plurality of overlays corresponding to the overlay offsets; and
    storing the image file in a host memory;
    wherein each overlay includes a first IOCTL value, a second IOCTL value, an overlay index value, an overlay name and overlay code.

16. The non-transitory computer readable medium of claim 14, further comprising executable instructions for, prior to the receiving:
    transmitting a base image file to the SOC during startup.

17. The non-transitory computer readable medium of claim 14, further comprising executable instructions for:
    transmitting the first overlay 1024 bytes at a time.

18. The non-transitory computer readable medium of claim 14, wherein the transmitting further comprises:
    encrypting the first overlay prior to transmission.

19. A non-transitory computer readable medium having stored thereon computer executable instructions that, if executed by a System on a Chip (SOC), cause the SOC to perform a method to receive an overlay from a host processor, the SOC and the host processor coupled by a bus, the method comprising:
    transmitting an event to the host processor requesting the overlay, wherein the event includes a first input/output control (IOCTL) value and a string name; and
    receiving the overlay from the host processor, wherein an IOCTL value and an overlay name in the received overlay are equal to the corresponding first IOCTL value and the string name in the event.

20. The non-transitory computer readable medium of claim 19, further comprising executable instructions for, prior to the transmitting:
    receiving a base image file from the host processor during startup.

21. The non-transitory computer readable medium of claim 19, further comprising executable instructions for:
    receiving the overlay 1024 bytes at a time.

22. The non-transitory computer readable medium of claim 19, wherein the received overlay is encrypted.

23. The non-transitory computer readable medium of claim 22, further comprising executable instructions for decrypting the received overlay.

* * * * *

UNITED STATES PATENT AND TRADEMARK OFFICE
CERTIFICATE OF CORRECTION

PATENT NO. : 8,578,148 B2
APPLICATION NO. : 12/845175
DATED : November 5, 2013
INVENTOR(S) : Mahesh Iyer Page 1 of 1

It is certified that error appears in the above-identified patent and that said Letters Patent is hereby corrected as shown below:

In the Specification:

Column 1, line 34, "illustrates and example" should be replaced with --illustrates an example--.

Column 3, line 38, "illustrates and example" should be replaced with --illustrates an example--.

Signed and Sealed this
Seventh Day of January, 2014

Margaret A. Focarino
*Commissioner for Patents of the United States Patent and Trademark Office*